United States Patent [19]

Rumler

[11] Patent Number: 5,456,150

[45] Date of Patent: Oct. 10, 1995

[54] METHOD FOR SLITTING DOUBLE PLUSH FABRIC

[75] Inventor: Joseph E. Rumler, Chesnee, S.C.

[73] Assignee: Milliken Research Corporation, Spartanburg, S.C.

[21] Appl. No.: 373,741

[22] Filed: Jan. 16, 1995

Related U.S. Application Data

[62] Division of Ser. No. 171,829, Dec. 22, 1993, Pat. No. 5,417,497.

[51] Int. Cl.[6] .................................................. B26D 1/06
[52] U.S. Cl. ............................. 83/872; 83/874; 83/56; 83/614; 83/823
[58] Field of Search .................. 83/614, 823, 698.31, 83/698.71, 874, 872, 870, 56; 384/7, 10, 13, 26, 39–42

[56] References Cited

U.S. PATENT DOCUMENTS

| | | | |
|---|---|---|---|
| 3,133,465 | 5/1964 | Nicolay | 83/874 |
| 3,813,132 | 5/1974 | Sahm | 384/42 |
| 3,953,086 | 4/1976 | Chaffin | 384/39 |
| 4,300,271 | 11/1981 | Wohlhaupter | 384/7 |
| 4,941,758 | 7/1990 | Osawa | 384/42 |
| 5,001,950 | 3/1991 | Fokos et al. | 83/698.61 |
| 5,036,740 | 8/1991 | Tsai | 83/614 |

Primary Examiner—Kenneth E. Peterson
Attorney, Agent, or Firm—Kevin M. Kercher; Terry T. Moyer

[57] ABSTRACT

This invention relates to an improved double plush knife bearing mechanism for moving a carriage that holds a circular knife along a dove-tail track. The dove-tail track is a trapezoid having a parallel top and bottom portion with the width of the bottom portion exceeding the width of the top portion. Interconnecting the top and bottom portion are both a first outer side portion and a second outer side portion. The angle between the top portion and the first outer side portion is a first angle and the angle between the top portion and the second outer side portion is a second angle. The carriage has a bearing mechanism having a first bearing portion with a first component that is positioned adjacent to the top portion of the dove-tail track. There is a second component of the first bearing portion attached to the first component of the first bearing portion or integrally connected thereto and positioned adjacent to the first outer side portion of the dove-tail track at a third angle that is three to eight degrees less than the first angle.

6 Claims, 3 Drawing Sheets

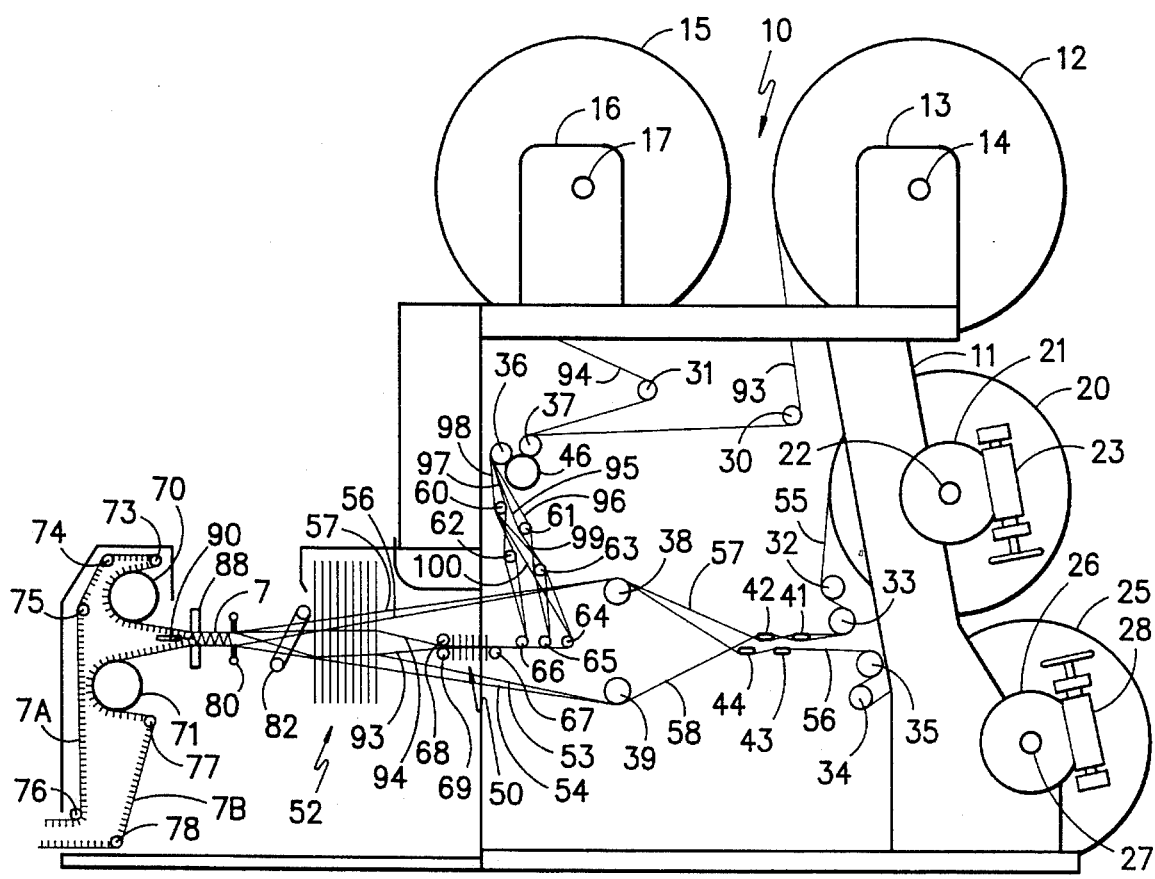
FIG. -1-
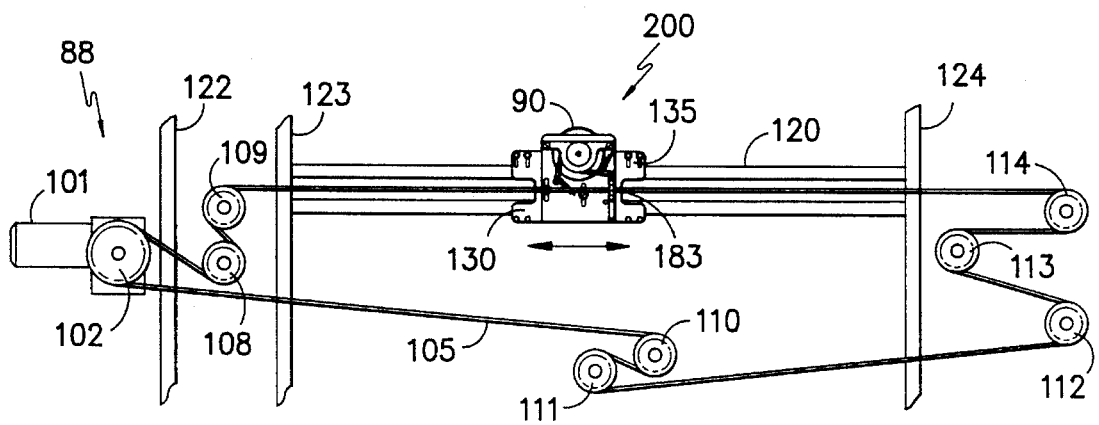
FIG. -2-

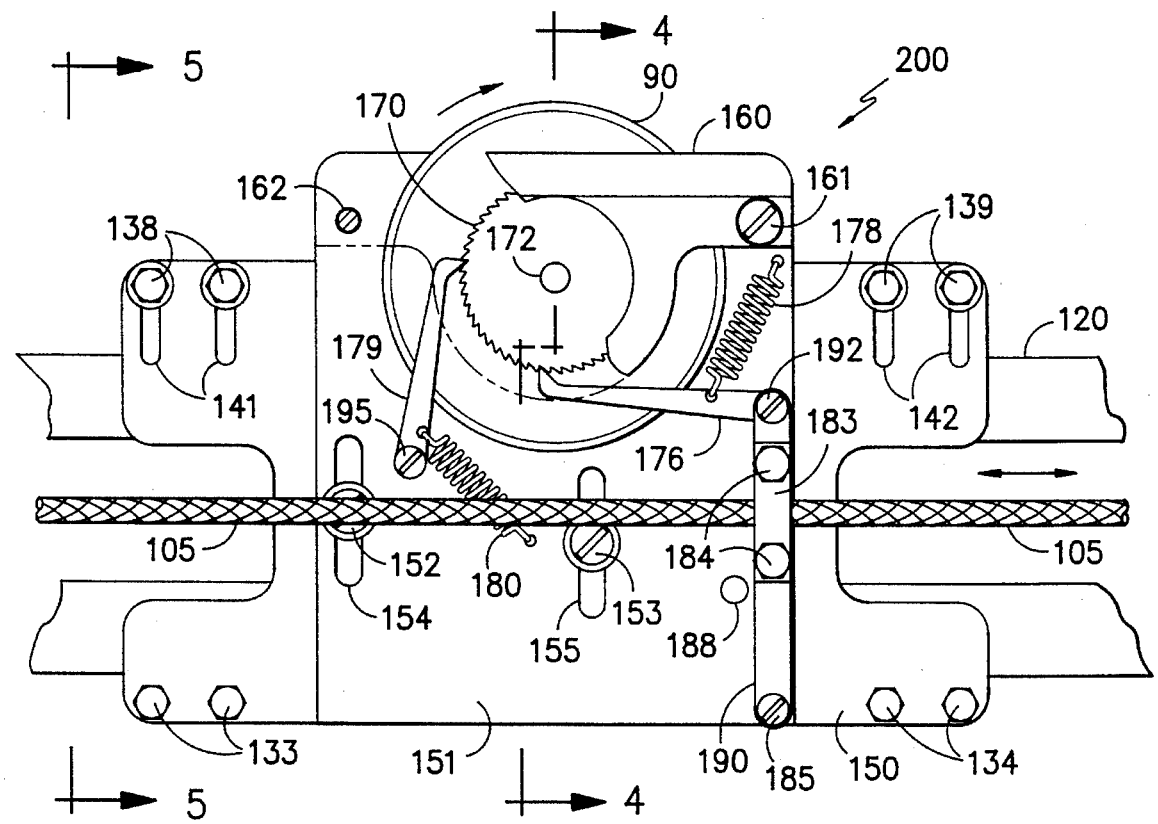
FIG. -3-
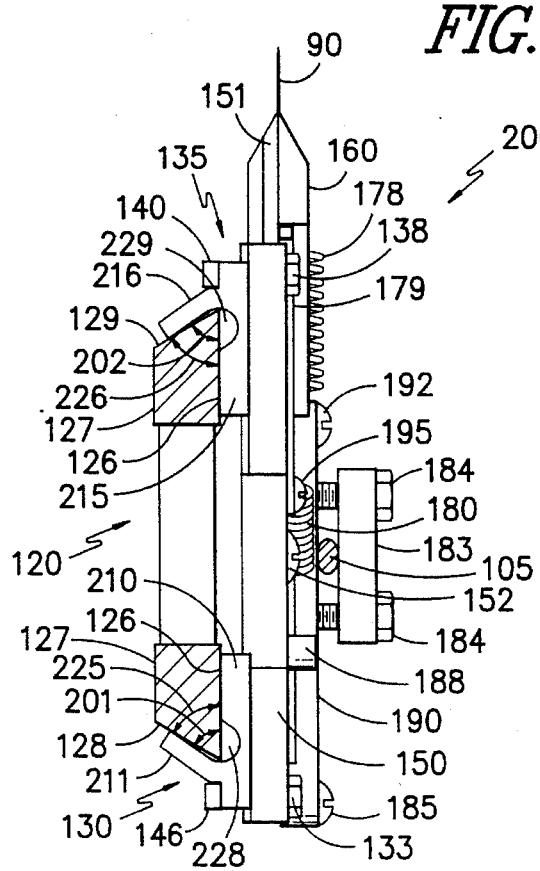
FIG. -4-
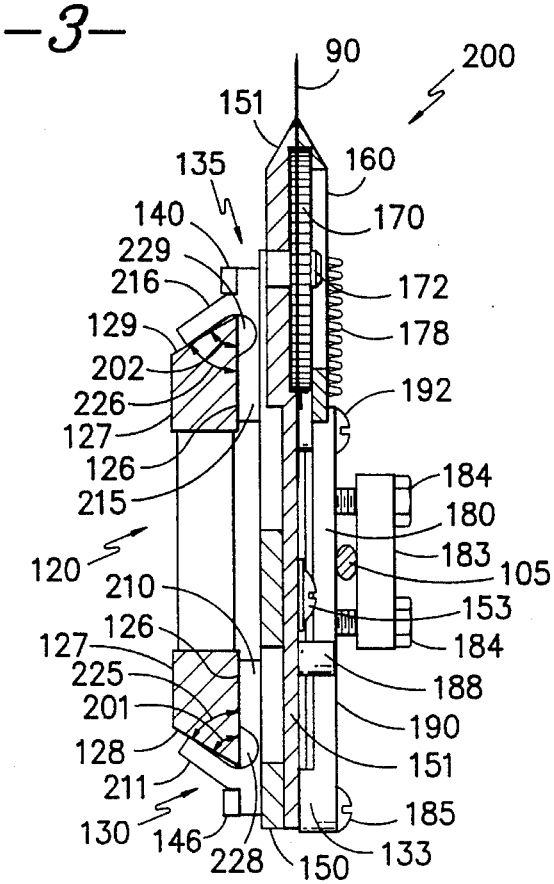
FIG. -5-

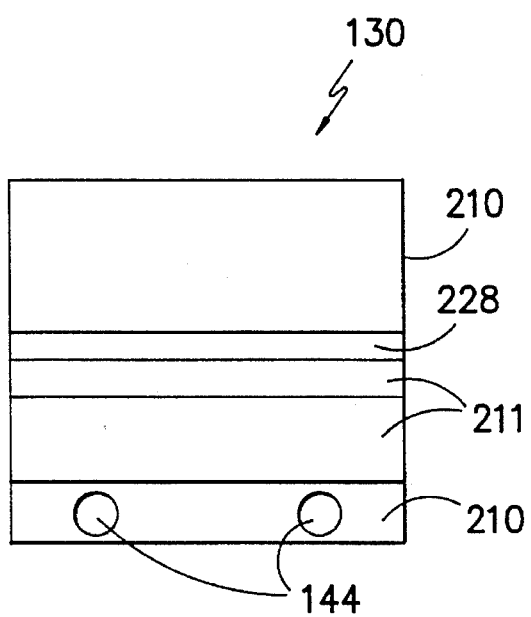
FIG. -6-
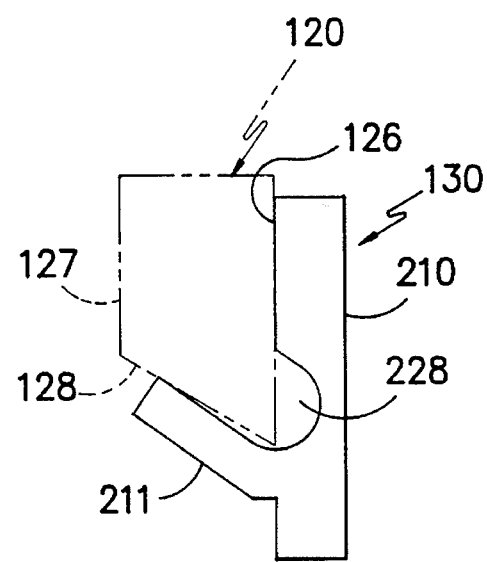
FIG. -7-

METHOD FOR SLITTING DOUBLE PLUSH FABRIC

This is a divisional application of patent application Ser. No. 08/171,829, filed Dec. 22, 1993, now U.S. Pat. No. 5,417,497 for METHOD AND APPARATUS FOR SLITTING DOUBLE PLUSH FABRIC. Specific references is being made herein to obtain the benefit of its earlier filing date.

BACKGROUND OF THE INVENTION

This invention relates to improved apparatus for slitting double plush fabric. Currently, an indexing knife is used for slitting double plush fabrics. These fabrics are constructed in the form of a sandwich with a backing layer on the top and bottom and yarns extending therebetween. The cutting apparatus is a circular knife held in a carriage which moves back and forth upon a dove-tail track. The circular knife is held by a ratchet wheel which can be rotated by a pawl on the carriage. When the carriage reaches the end of the dove-tail track, the inertia of the carriage causes the blade to rotate. As a result of the circular blade being constantly rotated, wear is evenly distributed around the blade. The circular blade reciprocates on the dove-tail track across the width of the fabric. The carriage rides on bearings which are attached to the dove-tail track to allow movement in the horizontal plane with a minimum of movement in the vertical plane. The bearing is an extended member which conforms to the angle of the dove-tail track. Due to variations in the track, the carriage has some looseness which results in defects in the double plush fabric. This is due to the balance that must be reached in allowing movement on the dove-tail track by utilizing a bearing which conforms to the exact shape of the dove-tail track. It is found that there must inherently be some play between the bearing and the dove-tail track, thereby resulting in significant quality problems. Furthermore, there is very little or no flexibility in the bearings which conform exactly to the dimensions of a dove-tail track.

The present invention solves these problems that are not disclosed in prior art.

SUMMARY OF THE INVENTION

This invention relates to an improved double plush knife bearing mechanism for moving a carriage that holds a circular knife along a dove-tail track. The dove-tail track is a trapezoid having a parallel top and bottom portion with the width of the bottom portion exceeding the width of the top portion. Interconnecting the top and bottom portion are both a first outer side portion and a second outer side portion. The angle between the top portion and the first outer side portion is a first angle and the angle between the top portion and the second outer side portion is a second angle. The carriage has a bearing mechanism having a first bearing portion with a first component that is positioned adjacent to the top portion of the dove-tail track. There is a second component of the first bearing portion attached to the first component of the first bearing portion or integrally connected thereto and positioned adjacent to the first outer side portion of the dove-tail track at a third angle that is three to eight degrees less than the first angle. In addition, the bearing mechanism has a second bearing portion having a third component that is positioned adjacent to the top portion of the dove-tail track. There is a fourth component of the second bearing portion attached to the third component of the second bearing portion or integrally connected thereto and positioned adjacent to the second outer side portion of the dove-tail track at a fourth angle that is three to eight degrees less than the second angle. There is an arcuate aperture between the first component and the second component of the first bearing portion and an arcuate aperture between the third component and the fourth component of the second bearing portion.

An advantage of this invention is to eliminate the inherent looseness or play between a dove-tail track and a bearing mechanism of a carriage for a circular knife that slits double plush fabric.

It is another advantage of this invention is to have flexibility in a bearing mechanism of a carriage for a double plush fabric circular knife while applying constant pressure to a dove-tail track.

Yet another advantage of this invention is to eliminate inconsistencies and off-quality while slitting double plush fabric with a circular knife held by a bearing mechanism of a carriage that traverses a dove-tail track.

These and other advantages will be a part apparent and in part pointed out below.

BRIEF DESCRIPTION OF THE DRAWING

The above as well as other objects of the invention will become more apparent from the following detailed description of the preferred embodiments of the invention when taken together with the accompanying drawings, in which:

FIG. 1 is a schematic side elevational view of an apparatus for cutting double plush fabric utilizing a circular knife blade held in a carriage having a bearing mechanism incorporating the novel features of the present invention whereby the bearing mechanism rides on a dove-tail track;

FIG. 2 is an isolated view of the circular knife carriage having a bearing mechanism and dove-tail track along with the mechanism for moving the circular knife carriage along the dove-tail track;

FIG. 3 is a top plan view of the circular knife carriage that is attached to the novel bearing mechanism that incorporates the novel features of the present invention as well as the dove-tail track;

FIG. 4 is cross-sectional view taken on line 5—5 of FIG. 3;

FIG. 5 is cross-sectional view taken on line 4—4 of FIG. 3;

FIG. 6 is a bottom view of a portion of the bearing mechanism incorporating the novel features of the present invention; and FIG. 7 is an isolated side view of a portion of the double plush knife bearing mechanism incorporating the novel features of the present invention in conjunction with a dove-tail track.

DETAILED DESCRIPTION OF THE PREFERRED EMBODIMENT

Referring now to the accompanying drawings, and initially to FIG. 1, which depicts a double plush fabric loom as generally indicated by numeral 10. Double plush fabric loom 10 has a support frame 11 having a first yarn beam 12 and a second yarn beam 15 mounted thereto. First yarn beam 12 is rotatably attached to support frame 11 by means of a first yarn beam support member 13 having a first yarn beam axle 14 located therein upon which first yarn beam 12 is rotated. Second yarn beam 15 is rotatably attached to second yarn beam axle 17 which is held in position by a second yarn beam support member 16 that is attached to support frame 11. First yarn 93 leaves first yarn beam 12 and passes over a first idler roll 30 while second yarn 94 leaves second beam 15 and passes over a second idler roll 31.

Both first yarn 93 exiting first yarn beam 12 and second yarn 94 exiting second yarn beam 15 pass over third idler roll 37, tension roll 46, and then a fourth idler roll 36. First yarn 93 is separated into two first yarn components 95 and 96, respectively. These two first yarn components 95, 96 surround a first tension support bar 61, second tension support bar 63 and loop around a third tension support bar 65. Second yarn 94 is separated into two second yarn components 97 and 98, respectively. Second yarn components 97 and 98 surround a fourth tension support bar 60, fifth tension support bar 62 and loop around a sixth tension support bar 66. After passing on the outside of fourth tension support bar 60, second yarn component 98 splits into two secondary second yarn components 99 and 100 that surround the second tension support bar 63 and then loop around the seventh tension support bar 64.

All six yarn components 95, 96, 97, 98, 99, and 100 merge after first yarn components 95 and 96 pass around third tension support bar 65, second yarn components 97 and 98 pass around sixth tension support bar 66, and secondary second yarn components 99 and 100 pass around seventh tension support bar 64. Yarn components 95, 96, 97, 98, 99, and 100 then all pass over eighth tension support bar 67 to form the intermediate plush yarns of the double plush fabric and then pass through drop wires 50 and then through ninth tension support bar 68 and tenth tension support bar 69 that are in an adjacent and opposed relationship. The yarn components 95, 96, 97, 98, 99, and 100 are then reformed into the first yarn 93 and second yarn 94. First yarn 93 and second yarn 94 then pass into the needling mechanism 52 and into the reed mechanism 82 and then on into the gap setting device 80.

The backing of the double plush fabric is formed of yarns from a third yarn beam 20 and a fourth yarn beam 25. The third yarn beam 20 is rotatably mounted on a third yarn beam axle 22. Third yarn beam axle 22 is attached to support frame 11 by means of a third yarn beam support member 21. There is also a third yarn beam brake 23 to control the speed of the third yarn beam 20. Fourth yarn beam 25 is rotatably mounted on a fourth yarn beam axle 27. Fourth yarn beam axle 27 is attached to support frame 11 by means of a fourth yarn beam support member 26. There is also a fourth yarn beam brake 28 controlling the speed of fourth yarn beam 25. Third yarn 55 that exits from third yarn beam 20 goes around a fifth idler roll 32 and a sixth idler roll 33 and then separates into two third yarn components 57 and 58, respectively. Third yarn component 57 passes over first tension separation bar 41 and then passes under second tension separation bar 42. Third yarn component 57 then passes over seventh idler roll 38 and then moves into the needling mechanism 52 and then on into the reed mechanism 82 and then the gap setting device 80. Third yarn component 58 passes under first tension separation bar 41 and then passes over second tension separation bar 42. Third yarn component 58 then passes under an eighth idler roll 39 and splits into two secondary third yarn components 53, 54, respectively, which both pass into the needling mechanism 52 and then into the reed mechanism 82 and then on into the gap setting device 80.

There is a fourth yarn 56 that exits from a fourth yarn beam 25 and passes around a ninth idler roll 34 and a tenth idler roll 35. Fourth yarn 56 passes over a third tension separation bar 43 and then passes under a fourth tension separation bar 44. Fourth yarn 56 then passes over eighth idler roll 38 and then passes into the needling mechanism 52 and then into the reed mechanism 82 and then into the gap setting device 80.

The double plush fabric 7 formed within the gap setting device from yarn and yarn components 56, 57, 53, 54 exit the gap setting device 80. This double plush fabric 7 is then slit into two components 7A and 7B in the middle of double plush fabric 7 by a circular double plush knife 90 mounted on carriage 200 that can traverse a dove-tail track 120, as shown in FIG. 2. The dove-tail track 120 is mounted on a frame assembly that is generally indicated by numeral 88.

The top component of double plush fabric 7A passes around a first take-up roll 70 and then passes over eleventh idler roll 73, twelfth idler roll 74, thirteenth idler roll 75, and fourteenth idler roll 76, thereby exiting the double plush fabric loom 10. The bottom component of the double plush fabric 7B passes around a second take-up roll 71 and then goes over fifteenth idler roll 77 and sixteenth idler roll 78, thereby exiting the double plush fabric loom 10. Referring now to FIG. 2, the carriage as indicated by numeral 200 includes a first bearing portion 130 and a second bearing portion 135 for attachment to a dove-tail track 120. Carriage 200 moves along dove-tail track 120 between an intermediate rail member 123 and a bottom rail member 124 by means of a clamp 183 that frictionally engages a rope 105. Rope 105 is a continuous loop that is moved by a drive pulley 102 attached to a motor 101 that is attached to a top rail member 122. Top rail member 122, intermediate rail member 123, bottom rail member 124, and the dove-tail track 120 form the frame assembly that is generally denoted by numeral 88. Rope 105 passes around first pulley 108, then a second pulley 109 and then is frictionally held by the clamp 183 mounted on the carriage 200. On the other side of the drive pulley 102, the rope 105 loops around a third pulley 110, a fourth pulley 111, fifth pulley 112, sixth pulley 113, and seventh pulley 114 before being frictionally held by the clamp 183.

Referring now to FIGS. 3, 4, and 5, carriage 200 includes a circular double plush knife 90 wherein the inside of circular double plush knife 90 is centrally mounted a ratchet wheel 170 wherein the circular double plush knife 90 and ratchet wheel 170 move together and are held together by a confinement mechanism 160 on top and a top plate member 151 below. The circular double plush knife 90 and ratchet wheel 170 are rotatable by means of a ratchet wheel rivet pin 172. The confinement mechanism 160 is attached to a top plate member 151 by means of a first confinement mechanism bolt 161 and a second confinement mechanism bolt 162. Top plate member 151 is adjustably attached to a bottom plate member 150 by means of first top plate bolt 152 that can be located within a first oval top plate opening 154 as well as a second top plate bolt 153 that also has a second oval top plate opening 155 to permit lateral movement of the top plate member 151 in relation to the bottom plate member 150.

Bottom plate member 150 is fixedly attached to a first bearing portion 130 by a first pair of bottom plate bolts 133 through a first pair of bottom plate apertures 144, as shown in FIG. 6, and are secured by a first pair of bottom plate nuts 146. Also, bottom plate member 150 is fixedly attached to the first bearing portion 130 by a second pair of bottom plate bolts 134 through a second pair of bottom plate apertures (not shown) and are secured by a second pair of bottom plate nuts (not shown) in the same manner as by the first pair of bottom plate bolts 133.

Bottom plate member 150 is attached to a second bearing portion 135 by a third pair of bottom plate bolts 138 that extend through a first pair of oval bottom plate openings 141 and are attached to a third pair of nuts 140 to permit lateral adjustment of both the first bearing portion 130 and second bearing portion 135 in relation to the dove-tail track 120. Also, bottom plate member 150 is attached to the second bearing portion 135 by a fourth pair of bottom plate bolts 139 that extend through a second pair of oval bottom plate openings 142 and are attached to a fourth pair of nuts (not shown) to permit lateral adjustment of both the first bearing portion 130 and second bearing portion 135 in relation to the dove-tail track 120.

The ratchet wheel 170 moves one notch upon each traverse across the dove-tail track 120, which occurs when carriage 200 reaches the end of dove-tail track 120, then inertia moves a first pawl 176 backward toward pivot pin 188. First pawl 176 is connected to first pawl leg member 190 by means of a tension bolt 192. Clamp 183 is attached to first pawl leg member 190 by means of a pair of bolts 184 to provide a rectangular opening to frictionally engage the rope 105. First pawl leg member 190 is secured to the top plate 151 by means of a screw 185. First pawl 176 can only move ratchet wheel 170 forward one notch due to the G constriction of pivot pin 188 and bottom plate member 150. The first pawl 176 is held against the ratchet wheel 170 by means of a spring 178 that is attached to first pawl 176 and to top plate 151. There is a second pawl 179 which prevents the backward movement of ratchet wheel 170. Second pawl 179 is attached to top plate member 151 by means of pivot screw 195. Second pawl 179 is held against ratchet wheel 170 by means of a second spring 180. The second spring is attached at one end to the second pawl 179 and at the other end to the top plate member 151.

Referring now to FIGS. 4, 5, 6, and 7, the dove-tail track 120 is typically defined as a trapezoid having a parallel top portion 126 and bottom portion 127 with the width of the top portion 126 exceeding the width of the bottom portion 127. Interconnecting the top portion 126 and bottom portion 127 are both a first outer side portion 128 and a second outer side portion 129. The angle between the top portion 126 and the first outer side portion 128 is a first angle 201 and the angle between the top portion 126 and the second outer side portion 129 is a second angle 202. The carriage 200 has a first bearing portion that is numerically designated by numeral 130. First bearing portion 130 has a first component 210 that is positioned adjacent to the top portion 126 of the dove-tail track 120 and a second component 211 attached to the first component 210 or integrally connected thereto and positioned adjacent to the first outer side portion 128 of the dove-tail track 120. The third angle 225 is between the first component 210 and the second component 211 of first bearing portion 130 and is between three to eight degrees less than first angle 201 with a preferred value of fifty-five degrees.

In addition, the carriage 200 has a second bearing portion that is numerically designated by numeral 135. Second bearing portion 135 has a third component 215 that is positioned adjacent to the top portion 126 of the dove-tail track 120 and a fourth component 216 attached to the third component 215 or integrally connected thereto and positioned adjacent to the second outer side portion 129 of the dove-tail track 120. The fourth angle 226 between the third component 215 and the fourth component 216 of second bearing portion 135 is between three to eight degrees less than second angle 202 with a preferred value of fifty-five degrees.

In addition, there is a first arcuate aperture 228 that is in the form of a one hundred and eighty degree half-circle between the first component 210 and the second component 211 of the first bearing portion 130 and a second arcuate aperture 229 that is in the form of a one hundred and eighty degree half-circle between the third component 215 and the fourth component 216 of the second bearing portion 135. The angular degree range for either the first arcuate aperture 228 or the second arcuate aperture 229 can range from one hundred and seventy to one hundred and ninety degrees with a one hundred and eighty degree half-circle as the preferred value.

Both first bearing portion 130 and second bearing portion 135 must be resilient and preferably constructed out of a resilient material, e.g., plastic, in order for this circular double plush knife 90 mounted on a carriage 200 to function. The utilization of nonresilient material with lesser angles would prevent the movement of the carriage 200 on the dove-tail track 120.

As this invention may be embodied in several forms without departing from the spirit or essential character thereof, the embodiments presented herein are intended to be illustrative and not descriptive. The scope of the invention is intended to be defined by the following appended claims, rather than any descriptive matter hereinabove, and all embodiments of the invention which fall within the meaning and range of equivalency of such claims are, therefore, intended to be embraced by such claims.

What is claimed is:

1. A process for slitting double plush textile fabric along a trapezoidal track, wherein said trapezoidal track having a top portion of a first width and a bottom portion of a second width wherein said second width is greater than said first width, a first outer side portion, and a second outer side portion, and a first angle between said top portion and said first outer side portion and a second angle between said top portion and said second outer side portion, comprising of a:

(a) a step of slitting double plush fabric with a circular knife mounted on a carriage having first resilient bearing portion having a first component positioned adjacent said top portion of said trapezoidal track and a second component operatively connected to said first component and positioned adjacent said first outer side portion of said trapezoidal track and forming a third angle between said first component and said second component wherein said third angle is in a range of three to eight degrees less than said first angle and a second resilient bearing portion having a third component positioned adjacent said top portion of said trapezoidal track and a fourth component operatively connected to said third component and positioned adjacent said second outer side portion of said trapezoidal track and forming a fourth angle between said third component and said fourth component wherein said fourth angle is in a range of three to eight degrees less than said second angle.

2. A process for slitting double plush textile fabric along a trapezoidal track, wherein said trapezoidal track having a top portion of a first width and a bottom portion of a second width wherein said second width is greater than said first width, a first outer side portion, and a second outer side portion, and a first angle between said top portion and said first outer side portion and a second angle between said top portion and said second outer side portion, comprising of a:

(a) a step of slitting double plush fabric with a circular knife mounted on a carriage having first resilient bearing portion having a first component positioned adjacent said top portion of said trapezoidal track and a second component operatively connected to said first component and positioned adjacent said first outer side portion of said trapezoidal track and forming a third angle between said first component and said second component wherein said third angle is in a range of three to eight degrees less than said first angle and a second resilient bearing portion having a third component positioned adjacent said top portion of said trapezoidal track and a fourth component operatively connected to said third component and positioned adjacent said second outer side portion of said trapezoidal track and forming a fourth angle between said third component and said fourth component wherein said fourth angle is in a range of three to eight degrees less than said second angle, and wherein said first resilient bearing portion includes a first arcuate slit between said first component and said second component and said second resilient bearing portion includes a second arcuate slit between said third component and said fourth component.

3. A process for slitting double plush textile fabric along a trapezoidal track, wherein said trapezoidal track having a top portion of a first width and a bottom portion of a second width wherein said second width is greater than said first width, a first outer side portion, and a second outer side portion, and a first angle between said top portion and said first outer side portion and a second angle between said top portion and said second outer side portion, comprising of a:

(a) a step of slitting double plush fabric with a circular knife mounted on a carriage having first resilient bearing portion having a first component positioned adjacent said top portion of said trapezoidal track and a second component operatively connected to said first component and positioned adjacent said first outer side portion of said trapezoidal track and forming a third angle between said first component and said second component wherein said third angle is in a range of four to six degrees less than said first angle and a second resilient bearing portion having a third component positioned adjacent said top portion of said trapezoidal track and a fourth component operatively connected to said third component and positioned adjacent said second outer side portion of said trapezoidal track and forming a fourth angle between said third component and said fourth component wherein said fourth angle is in a range of four to six degrees less than said second angle.

4. A process for slitting double plush textile fabric along a trapezoidal track, wherein said trapezoidal track having a top portion of a first width and a bottom portion of a second width wherein said second width is greater than said first width, a first outer side portion, and a second outer side portion, and a first angle between said top portion and said first outer side portion and a second angle between said top portion and said second outer side portion, comprising of a:

(a) a step of slitting double plush fabric with a circular knife mounted on a carriage having first resilient bearing portion having a first component positioned adjacent said top portion of said trapezoidal track and a second component operatively connected to said first component and positioned adjacent said first outer side portion of said trapezoidal track and forming a third angle between said first component and said second component wherein said third angle is in a range of four to six degrees less than said first angle and a second resilient bearing portion having a third component positioned adjacent said top portion of said trapezoidal track and a fourth component operatively connected to said third component and positioned adjacent said second outer side portion of said trapezoidal track and forming a fourth angle between said third component and said fourth component wherein said fourth angle is in a range of four to six degrees less than said second angle, and wherein a first arcuate slit between said first component and said second component is in a range of one hundred and seventy to one hundred and ninety degrees and a second arcuate slit between said third component and said fourth component is in a range of one hundred and seventy to one hundred and ninety degrees.

5. A process for slitting double plush textile fabric along a trapezoidal track, wherein said trapezoidal track having a top portion of a first width and a bottom portion of a second width wherein said second width is greater than said first width, a first outer side portion, and a second outer side portion, and a first angle between said top portion and said first outer side portion and a second angle between said top portion and said second outer side portion, comprising of a:

(a) a step of slitting double plush fabric with a circular knife mounted on a carriage with a first resilient bearing portion having a first component positioned adjacent said top portion of said trapezoidal track and a second component operatively connected to said first component and positioned adjacent said first outer side portion of said trapezoidal track and forming a third angle between said first component and said second component wherein said third angle is substantially five degrees less than said first angle and a second resilient bearing portion having a third component positioned adjacent said top portion of said trapezoidal track and a fourth component operatively connected to said third component and positioned adjacent said second outer side portion of said trapezoidal track and forming a fourth angle between said third component and said fourth component wherein said fourth angle is substantially five degrees less than said second angle.

6. A process for slitting double plush textile fabric along a trapezoidal track, wherein said trapezoidal track having a top portion of a first width and a bottom portion of a second width wherein said second width is greater than said first width, a first outer side portion, and a second outer side portion, and a first angle between said top portion and said first outer side portion and a second angle between said top portion and said second outer side portion, comprising of a:

(a) a step of slitting double plush fabric with a circular knife mounted on a carriage with a first resilient bearing portion having a first component positioned adjacent said top portion of said trapezoidal track and a second component operatively connected to said first component and positioned adjacent said first outer side portion of said trapezoidal track and forming a third angle between said first component and said second component wherein said third angle is substantially five degrees less than said first angle and a second resilient bearing portion having a third component positioned adjacent said top portion of said trapezoidal track and a fourth component operatively connected to said third component and positioned adjacent said second outer side portion of said trapezoidal track and forming a fourth angle between said third component and said fourth component wherein said fourth angle is substantially five degrees less than said second angle, and wherein a first arcuate slit between said first component and said second component is of substantially a one hundred and eighty degree half-circle and a second arcuate slit between said third component and said fourth component is substantially a one hundred and eighty degree half-circle.

* * * * *